(12) United States Patent
Satou et al.

(10) Patent No.: US 8,344,915 B2
(45) Date of Patent: Jan. 1, 2013

(54) KEYBOARD AND INFORMATION PROCESSING DEVICE

(75) Inventors: Yoshihisa Satou, Kawasaki (JP); Yoshinori Mesaki, Kawasaki (JP); Masayuki Itoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 563 days.

(21) Appl. No.: 12/585,746

(22) Filed: Sep. 23, 2009

(65) Prior Publication Data

US 2010/0090872 A1 Apr. 15, 2010

(30) Foreign Application Priority Data

Sep. 29, 2008 (JP) .................. 2008-250364

(51) Int. Cl.
*H03M 11/00* (2006.01)
(52) U.S. Cl. ............ 341/22; 341/29; 345/164; 345/168; 345/169
(58) Field of Classification Search .............. 341/20–23; 345/157–172
See application file for complete search history.

(56) References Cited

U.S. PATENT DOCUMENTS

| | | | |
|---|---|---|---|
| 5,059,048 A | 10/1991 | Sirkin | |
| 5,393,150 A * | 2/1995 | Fort | 400/489 |
| 5,660,488 A * | 8/1997 | Miller | 400/486 |
| 5,670,991 A | 9/1997 | Kuo et al. | |
| 6,088,022 A | 7/2000 | Rakoski | |
| 6,467,979 B2 * | 10/2002 | Camacho et al. | 400/489 |
| 6,489,950 B1 * | 12/2002 | Griffin et al. | 345/168 |
| 6,726,106 B1 * | 4/2004 | Han et al. | 235/472.01 |
| 7,113,111 B2 * | 9/2006 | Tyneski et al. | 341/20 |
| 7,220,069 B2 * | 5/2007 | Griffin et al. | 400/486 |
| 7,338,224 B2 * | 3/2008 | Jones et al. | 400/489 |
| 7,825,833 B2 * | 11/2010 | Manthe, III | 341/20 |
| 8,004,495 B2 * | 8/2011 | Fux et al. | 345/169 |
| 2003/0020692 A1 * | 1/2003 | Griffin et al. | 345/168 |
| 2004/0037604 A1 | 2/2004 | McNamara et al. | |
| 2004/0222970 A1 | 11/2004 | Martinez et al. | |
| 2005/0019079 A1 | 1/2005 | Griffin et al. | |
| 2005/0190083 A1 | 9/2005 | Tyneski et al. | |
| 2007/0256913 A1 * | 11/2007 | Wee et al. | 200/5 A |
| 2010/0302157 A1 * | 12/2010 | Zilberman | 345/164 |

FOREIGN PATENT DOCUMENTS

| | | |
|---|---|---|
| CN | 2678002 Y | 2/2005 |
| JP | 9-73347 | 3/1997 |
| JP | 2002-341998 | 11/2002 |
| JP | 2003-288151 | 10/2003 |
| JP | 2004-329915 | 11/2004 |
| JP | 2005-134970 | 5/2005 |

OTHER PUBLICATIONS

Korean Office Action issued on Oct. 13, 2011 in corresponding Korean Patent Application No. 10-2009-0088581.

(Continued)

*Primary Examiner* — Linh Nguyen
(74) *Attorney, Agent, or Firm* — Staas & Halsey LLP

(57) ABSTRACT

A keyboard includes a base, and plural keys arranged on the base, wherein at least a part of the plural keys are arranged in plural steps in a depth direction of the keyboard, in the shape of a sector in such a manner that the keys closer to a central portion in a width direction of the keyboard are arranged backward whereas the keys closer to both end portions in the width direction of the keyboard are arranged forward.

8 Claims, 5 Drawing Sheets

OTHER PUBLICATIONS

Chinese Office Action for corresponding Chinese Application No. 200910175725.3, issued on May 12, 2011.
Korean Office Action issued Mar. 4, 2011 in corresponding Korean Patent Application 10-2009-0088581.
Chinese Office Action dated Dec. 23, 2011 issued in corresponding Chinese Patent Application No. 200910175725.3.
Japanese Office Action for corresponding Japanese Patent Application No. 2008-250364, mailed Feb. 21, 2012.
Chinese Office Action issued Aug. 9, 2012 in corresponding Chinese Patent Application No. 200910175725.3.

* cited by examiner

KEYBOARD AND INFORMATION PROCESSING DEVICE

CROSS-REFERENCE TO RELATED APPLICATION

This application is based upon and claims the benefit of priority of the prior Japanese Patent Application No. 2008-250364, filed on Sep. 29, 2008, the entire contents of which are incorporated herein by reference.

FIELD

The embodiments discussed herein are related to a keyboard disposed on a base, arranged with a plurality of keys, and an information processing device equipped with the keyboard.

BACKGROUND

Recently, with the widespread use of the Internet and e-mailing, information processing devices such as a personal computer and a PDA (Personal Digital Assistant) have been used among users of all ages. Keyboards of these information processing devices in general, use a same key arrangement of mechanical typewriters having been popular in the past. However, the key arrangement is not necessarily suitable to the structure of hands, arms, and elbows of a person and recently there arises a problem of inflammation of the tendon sheath and mental stress due to typing for long hours.

Regarding this problem, Japanese Laid-open Patent Publication No. H09-73347 describes a technique of opening a front side of a folding keyboard made up of a right side segment and a left side segment for use, to separate the right side segment and the left side segment from each other. According to this folding keyboard, plural keys are diagonally arranged in the shape of a V-letter when opened for use, enabling a user to use the keyboard with the arms naturally opened, thereby reducing loads on the shoulder and the elbows of the user.

However, although the above-described folding type keyboard may be able to reduce physical burdens when operating the keyboard with both hands, there is a problem that the shoulder and the arms need to be moved extensively similarly to conventional keyboards, when operating the keyboard with only one hand. Additionally, since the Shift key and the Control key that are pressed together with another key are arranged at both ends in a width direction of the keyboard, operating the conventional type keyboard with one hand is difficult. Further, moving the hand in the width direction of the keyboard is burdensome compared to moving in a depth direction thereof, therefore it is necessary to narrow the width of the keyboard to operate the keyboard with one hand. As a means for narrowing the width of the keyboard, it is conceivable to downsize keys of the keyboard by narrowing a distance between adjacent keys (key pitch) and to arrange keys so as to make the depth direction of the keyboard become a longitudinal direction.

However, downsizing the keys raises a problem of poor operability since an extra key may be often pressed together unintentionally. And for a user accustomed to the traditional QWERTY arrangement that has been widely employed, it is uncomfortable to use the keys that are arranged long in the depth direction of the keyboard. Recently, it is often the case where the keyboard is operated with one hand not only by handicapped users, but also by users holding a receiver or reference materials. In such a case, currently a mouse is often used and there is a demand for developing a keyboard with excellent key operation with one hand.

SUMMARY

According to a first aspect of the invention, a keyboard includes:
a base; and
plural keys arranged on the base,
wherein at least a part of the plural keys is arranged in plural steps in a depth direction of the keyboard, in the shape of a sector in such a manner that the keys closer to a central portion in a width direction of the keyboard are arranged backward whereas the keys closer to both end portions in the width direction of the keyboard are arranged forward.

According to this keyboard, since plural keys are arranged in the shape of a sector in such a manner that the keys closer to the central portion in the width direction of the keyboard are arranged closer to the deep side of the keyboard, the distance between the keys positioned at the both ends in the width direction is narrowed. This makes the key pitch narrower without downsizing the keys or changing arrangement order of the keys, which reduces the movement of hand in the width direction when operating the keys, thereby improving the operability of keys with one hand.

According to a second aspect of the invention, an information processing device includes:
a keyboard, including:
a base, and
plural keys arranged on the base; and
a display unit to display information entered by using the keyboard,
wherein at least a part of the plural keys is arranged in plural steps in a depth direction of the keyboard, in the shape of a sector in such a manner that the keys closer to a central portion in a width direction of the keyboard are arranged backward whereas the keys closer to both end portions in the width direction of the keyboard are arranged forward.

According to this information processing device, it is possible to narrow the key pitch without changing the size and arrangement order of keys, thereby improving the operability of keys with one hand.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Concrete embodiments of the keyboard and the information processing device will be explained with reference to drawings.

Figure 1:
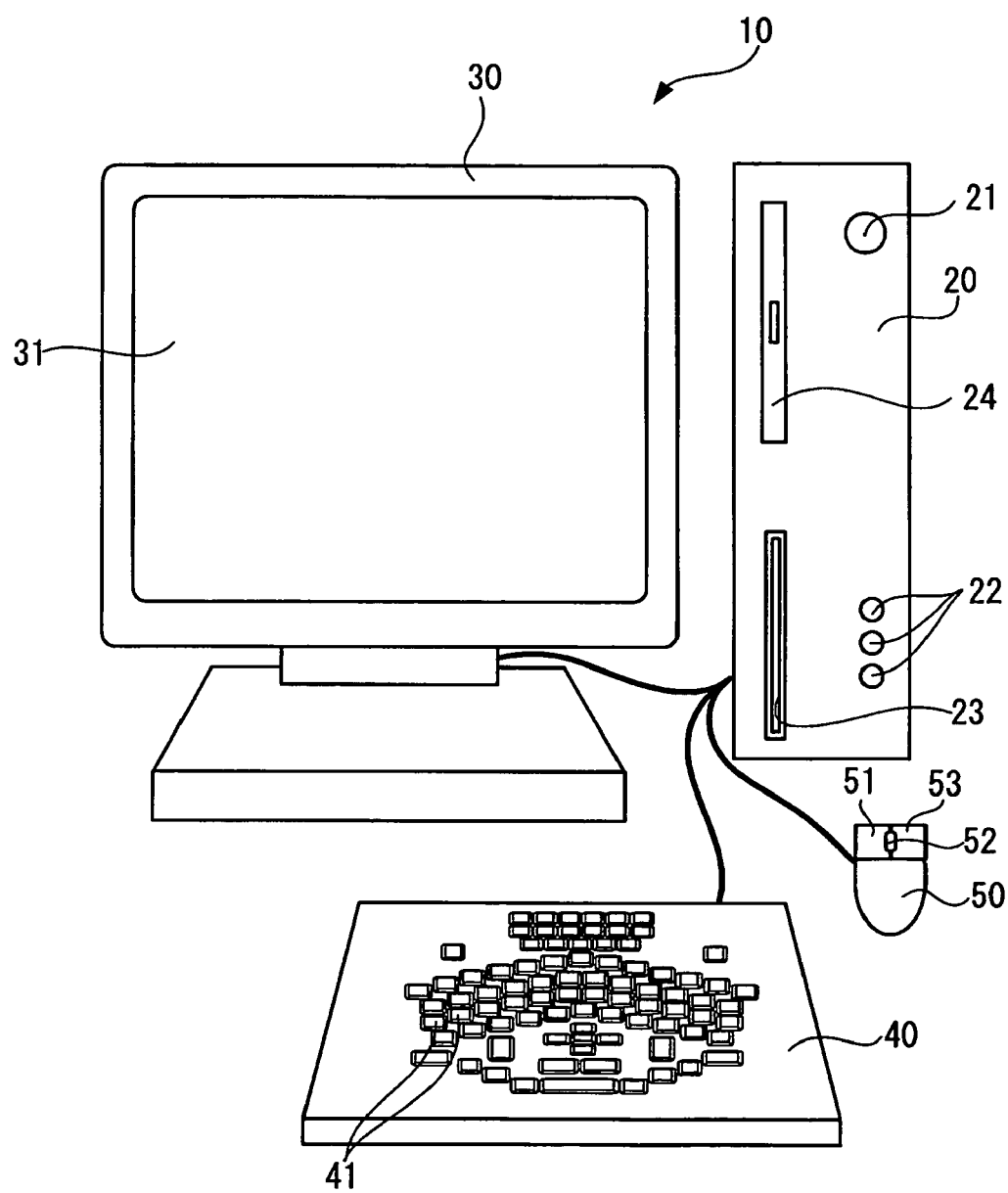
FIG. 1 is an appearance of a personal computer that is a concrete embodiment of the keyboard and the information processing device.

FIG. 1 is an appearance of a personal computer 10 that is a concrete embodiment of the keyboard and the information processing device.

The personal computer 10 has a structure in which a main unit 20 is connected to a display unit 30 with a display screen 31 on its front surface, to a keyboard 40 on which plural keys 41 are arranged, and to a mouse 50 provided with a left-click button 51, a right-click button 52, and a scroll wheel 53.

The main unit 20 incorporates a hard disk or the like and controls the entire personal computer 10. The main unit 20 also includes a power switch 21 for turning on power, various connectors 22 for connecting a microphone and an earphone, a FD slot 21 for inserting a flexible disk (hereafter, FD), and an optical disk slot 22 for inserting an optical disc such as a CD and a DVD.

The display unit 30 serves to display an image on the display screen 31 in accordance with a direction from the main unit 20, the keyboard 40 serves to input various information in accordance with key operations, the mouse 50 serves to input a direction in accordance with an icon or the like displayed on a position on the display screen 31 by specifying the position. The keyboard 40 is an example of the keyboard, the display unit 30 is an example of the display unit, and the keys 41 are examples of the keys.

The operability of the keys with one hand is improved in the personal computer 10 by a technique of arranging the keys 41 on the keyboard 40. Hereafter, the keyboard 40 will be explained in detail.

Figure 2:
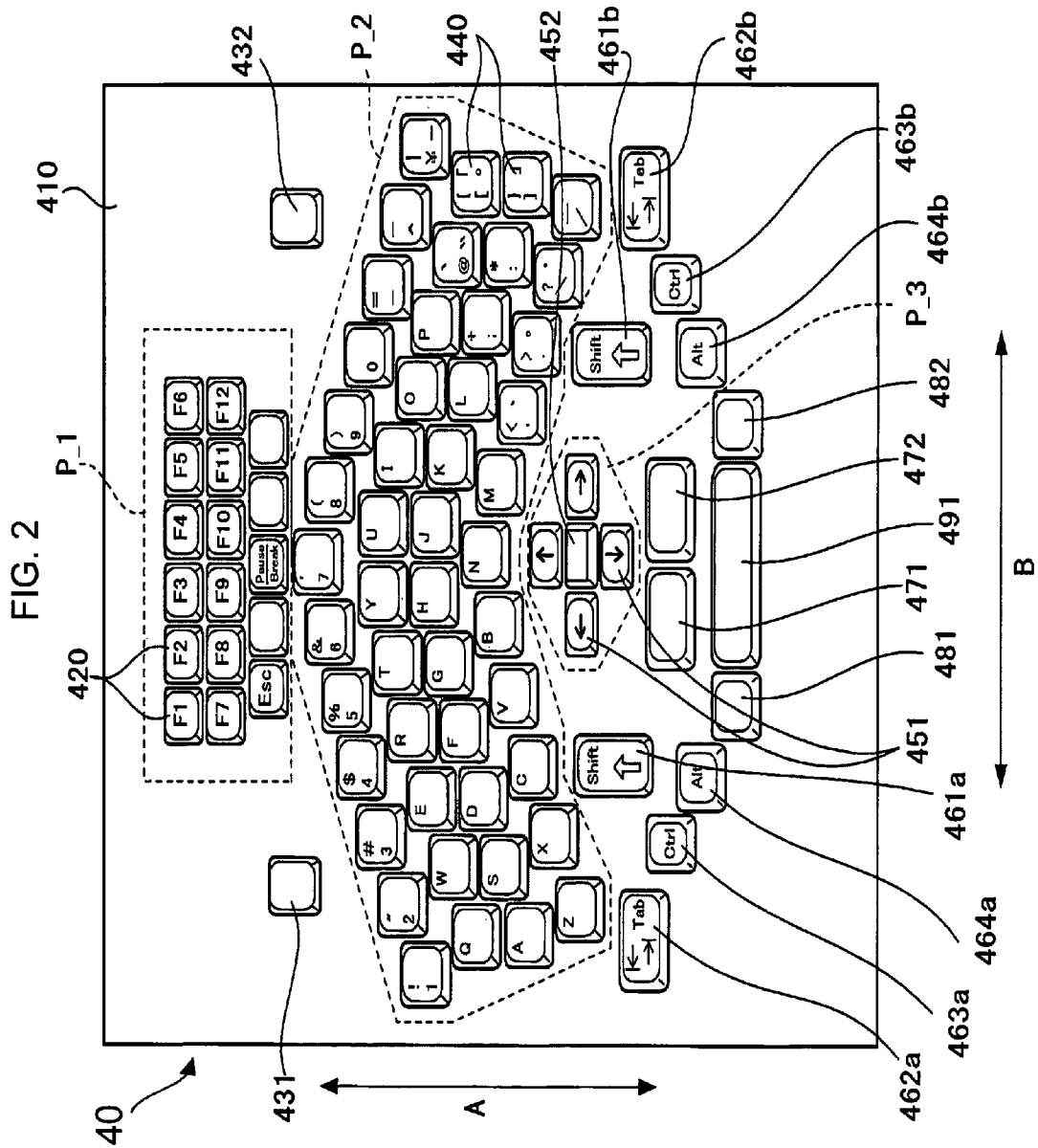
FIG. 2 is a diagram of the keyboard viewed from above.
Figure 3:
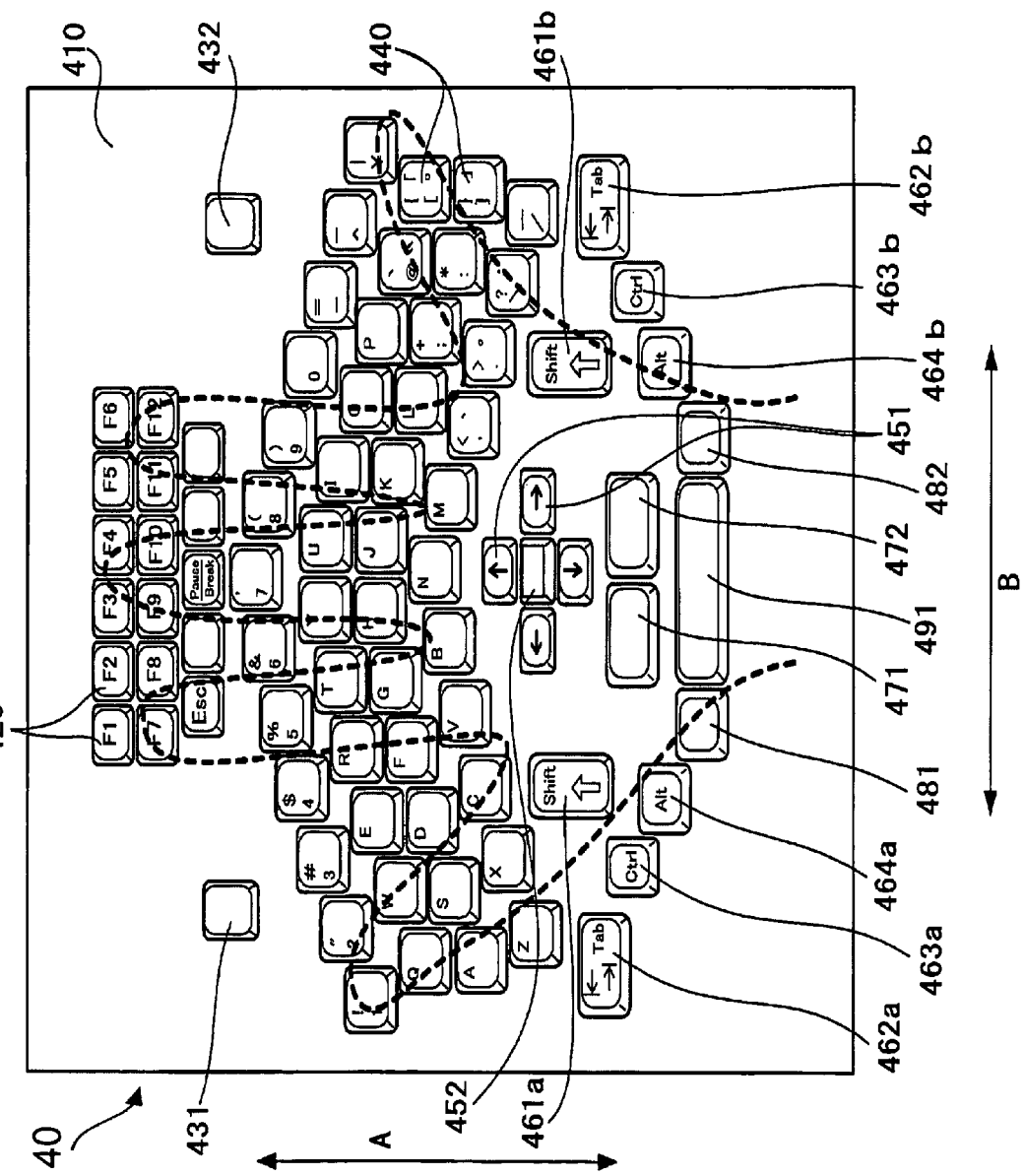
FIG. 3 is a diagram illustrating a state in which one hand is placed on the keyboard.

FIG. 2 is a diagram of the keyboard 40 viewed from above, and FIG. 3 is a diagram illustrating a state in which one hand is placed on the keyboard 40.

As illustrated in FIG. 2, the keyboard 40 is made up of the plural keys 41 arranged on its base 410. In FIG. 2, each of the keys 41 is marked with a symbol. The base 410 is an example of the base.

Alpha-numeric keys 440 to enter characters and numbers are arranged in a central region P_2 in a depth direction A on the base 410, in multiple steps in the depth direction A (four steps in the example of FIG. 2). Further, of the Alpha-numeric keys 440, keys that are closer to a central portion in a width direction B are arranged backward, whereas keys that are closer to both end portions in the width direction B are arranged forward. As a result, the Alpha-numeric keys 440 are arranged in the shape of a sector protruding to the deep side.

With the arrangement of the Alpha-numeric keys 440 in the shape of the sector, protruding to the deep side, it is possible to narrow the key pitch of the Alpha-numeric keys 440 without changing the size or arrangement order of the Alpha-numeric keys 440. Thereby, as illustrated in FIG. 3, the Alpha-numeric keys 440 can be arranged in a range reachable with the thumb and little finger, enabling the user to enter characters and numbers without moving the hand in the width direction B. Incidentally, since the thumb and little finger are shorter while the middle finger is the longest among the fingers, the five fingers fit the sector-shaped Alpha-numeric keys 440, reducing loads to be applied on hands and arms by the key input.

Also, in a region P_1 further backward of the Alpha-numeric keys 440, there are placed various function keys 420 such as function keys assigned with functions, a Delete key to delete a character right next to the cursor, and an Insert key for switching between insert and overwrite, which are placed at the deep side on the conventional keyboards. Moreover, in a region between the various function keys 420 and the Alpha-numeric keys 440, there are placed a single-width and a double-width switching key 431 for switching input between a single-width character and a double-width character, and a BackSpace key 432 for backspacing the cursor.

In a region P_3, which is a space in a central portion in the width direction B, forward of the Alpha-numeric keys 440, there are placed Arrow keys 451 for specifying four directions of up, down, right, and left, and a Menu key 452 for displaying a start menu screen. The Menu key 452 corresponds to the so-called Windows (registered trademark) key.

It is preferable that the Arrow keys 451 to direct four directions of up, down, right, and left are arranged forward of the plural keys arranged in the shape of the sector.

Placing the often used Arrow keys 451 and the Menu key 452 in the region P_3 near the central portion of the base 410 improves the operability of input with one hand, and enables downsizing of the entire keyboard 40 through the effective utilization of the space formed by arranging the Alpha-numeric keys 440 in the sector shape.

Further forward of the region P_3 in which the Arrow keys 451 and the Menu key 452 are placed, there are placed a switch key 471 for switching input mode between Hiragana, Katakana, and Roman character, an Enter key 472 to execute selected menu or function, a Conversion key 481 and a Non-conversion key 482 used for entering Hiragana and Katakana, and a space key 491 for entering a space.

At both ends of the region P_3 in the width direction B, tab keys 462a and 462b to indent are placed, respectively. Furthermore, Shift keys 461a and 461b, Control keys 463a and 463b, and Alt keys 464a and 464b, which are pressed together with another key 41 are also placed. These Shift keys 461a, 461b, Control keys 463a, 463b, and Alt keys 464a, 464b are used in combination with the Alpha-numeric keys 440. Placing these keys in the depth direction A so as to align with the Alpha-numeric keys 440 enables the user to press the Shift keys 461a, 461b with the thumb or little finger while allowing the other four fingers to press the Alpha-numeric keys 440, improving the operability of input with one hand.

It is preferable that the plural keys include a pair of keys having an identical function arranged at both end portions, respectively, in the width direction of the keyboard. It is further preferable that either of the pair keys is operated in combination with another key.

Since the Shift keys 461a, 461b, the Control keys 463a, 463b, and the Alt keys 464a, 464b, which are pressed simultaneously with another key 41 are arranged, respectively, on both ends of the base 410 in the width direction B, it is possible to operate the keyboard 40 easily with either right or left hand.

The tab keys 462a, 462b, the Control keys 463a, 463b, the Alt keys 464a, 464b, the Conversion key 481, and the No-conversion key 482 arranged further forward of the region P_3 in which the Arrow keys 451 and the Menu key 452 are placed are aligned in the shape of an arc. The keys closer to the central portion are arranged forward whereas the keys closer to the both end portions are arranged backward, forming the arc shape, in contrast to the Alpha-numeric keys 440 that are arranged in the shape of the sector in the central region P_2.

It is preferable that at least a part of the plurality of keys that are not arranged in the shape of the sector is arranged in the shape of an arc in such a manner that the keys closer to a central portion in the width direction are arranged forward whereas the keys closer to both end portions in the width direction of the keyboard are arranged backward.

According to the keyboard in the preferable embodiment, operability of the keys is improved since the arrangement of the keys aligned in the arc shape fits to an angle formed by the thumb and little finger when the hand is opened. Further, according to this arrangement, since the keys arranged in the shape of the arc and the keys arranged in the shape of the sector in the central region P_2 create the region P_3 to arrange the Arrow keys 451 and others, it is possible to downsize a device through the effective utilization of the space.

Next, explanation will be made about a technique of the undersurface of the keyboard 40.

Figure 4:
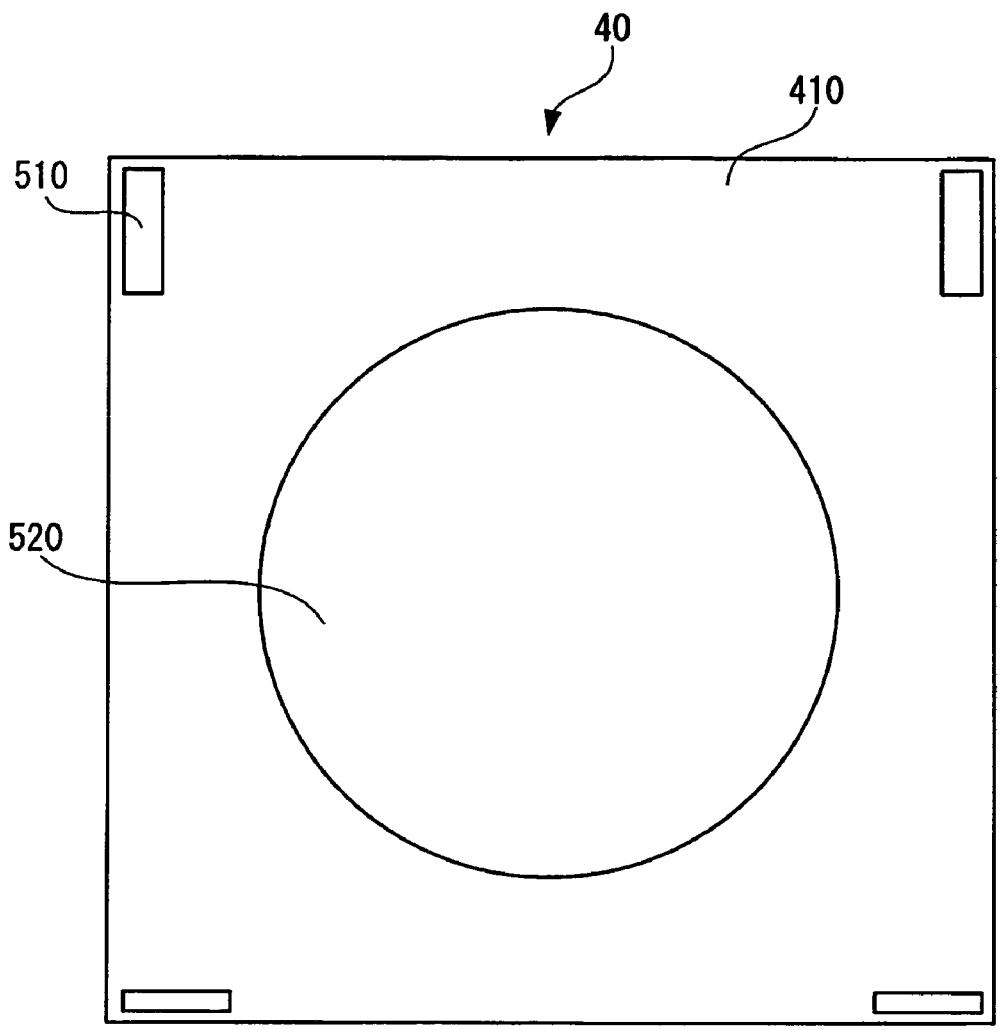
FIG. 4 is a diagram illustrating an undersurface of the keyboard.

FIG. 4 is a diagram illustrating the undersurface of the keyboard 40.

On the undersurface of the keyboard 40, a swivel stage 520 for swiveling the base 410 about a swivel axis extending in a vertical direction with respect to the base 410 and folding legs 510 are attached.

Figure 5:
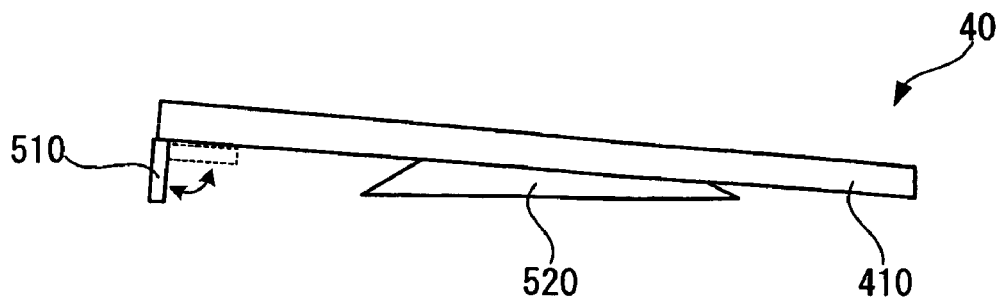
FIG. 5 is a diagram illustrating the keyboard with its legs standing, viewed from a side of the keyboard.

FIG. 5 is a diagram illustrating the keyboard 40 with its legs 510 standing, viewed from a side of the keyboard 40.

Standing the legs 510 attached on the undersurface of the keyboard 40 tilts the base 410. This makes the keys 41 arranged on the top surface of the base 410 tilt toward the front side, thereby improving the operability of the keyboard.

Figure 6:
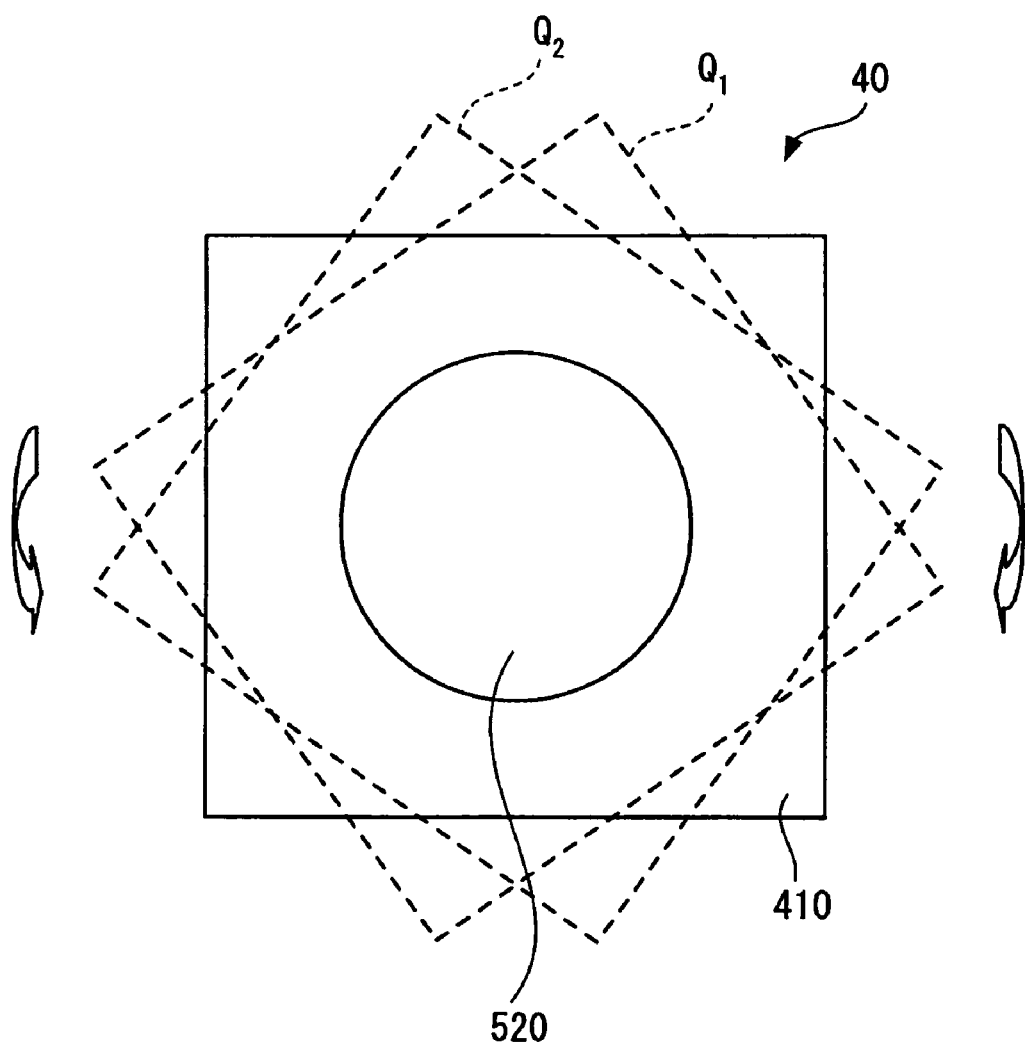
FIG. 6 is a diagram illustrating a state in which a base is swiveled.

FIG. 6 is a diagram illustrating a state in which the base 410 is swiveled.

It is preferable to further include a swivel stage to swivel the base about a swivel axis extending in a vertical direction with respect to the base, on an undersurface of the base, opposite a top surface of the base on which the plural keys are arranged.

For example, swiveling the base 410 to left, to a position like Q1, when the keyboard 40 is operated with the right hand, whereas swiveling the base 410 to right, to a position like Q2, when the keyboard 40 is operated with the left hand, fits the direction of the hand to the direction of the keys 41 on the keyboard 40. The swivel stage 520 is an example of the swivel stage.

As described above, according to the personal computer 10 of the present embodiment, the keys 41 are arranged in the shape of the sector such that the keys 41 closer to both end portions in the width direction B are arranged forward. Therefore, it is possible to narrow the key pitch without downsizing or changing arrangement order of the keys 41, improving the operability of the keys with one hand.

Although in the above descriptions, a desktop personal computer has been exemplified as an information processing device, the information processing device may be a notebook computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alterations could be made hereto without departing from the spirit and scope of the invention.

What is claimed is:

1. A keyboard, comprising:
    a base; and
    a plurality of keys arranged on the base, wherein
        at least a part of the plurality of keys is arranged in a plurality of steps in a depth direction of the keyboard, in the shape of a sector in such a manner that the keys closer to a central portion in a width direction of the keyboard are arranged backward whereas the keys closer to both end portions in the width direction of the keyboard are arranged forward, and
        at least a part of the plurality of keys being not arranged in the shape of the sector is arranged in a region which is adjacent to a key arranged in a most deep side of the at least a part of the plurality of keys arranged in the shape of the sector, which is deeper than the plurality of keys arranged in the shape of the sector, and whose width is narrower than a width of the shape of the sector.

2. The keyboard according to claim 1, wherein Arrow keys to direct four directions of up, down, right, and left are arranged forward of the plurality of keys arranged in the shape of the sector.

3. A keyboard, comprising:
    a base; and
    a plurality of keys arranged on the base, wherein
        at least a part of the plurality of keys is arranged in a plurality of steps in a depth direction of the keyboard, in the shape of a sector in such a manner that the keys closer to a central portion in a width direction of the keyboard are arranged backward whereas the keys closer to both end portions in the width direction of the keyboard are arranged forward, and
        at least a part of the plurality of keys that are not arranged in the shape of the sector is arranged in the shape of an arc in such a manner that the keys closer to a central portion in the width direction are arranged forward whereas the keys closer to both end portions in the width direction of the keyboard are arranged backward.

4. The keyboard according to claim 1, wherein the plurality of keys include a pair of keys having an identical function arranged at both end portions, respectively, in the width direction of the keyboard.

5. The keyboard according to claim 4, wherein either of the pair keys is operated in combination with another key.

6. The keyboard according to claim 4, wherein the pair of keys is at least a pair of Shift keys, a pair of Alt keys, or a pair of Control keys.

7. The keyboard according to claim 1, further comprising a swivel stage to swivel the base about a swivel axis extending in a vertical direction with respect to the base, on an undersurface of the base, opposite a top surface of the base on which the plurality of the keys are arranged.

8. An information processing device, comprising:
    a keyboard, comprising:
        a base, and
        a plurality of keys arranged on the base; and
        a display unit to display information entered by using the keyboard, wherein
            at least a part of the plurality of keys is arranged in a plurality of steps in a depth direction of the keyboard, in the shape of a sector in such a manner that the keys closer to a central portion in a width direction of the keyboard are arranged backward whereas the keys closer to both end portions in the width direction of the keyboard are arranged forward, and
            at least a part of the plurality of keys being not arranged in the shape of the sector is arranged in a region which is adjacent to a key arranged in a most deep side of the at least a part of the plurality of keys arranged in the shape of the sector, which is deeper than the plurality of keys arranged in the shape of the sector, and whose width is narrower than a width of the shape of the sector.

* * * * *